Feb. 21, 1950 W. J. DALY 2,498,397
TOOL FOR SHEET METAL WORKERS
Filed Oct. 10, 1946
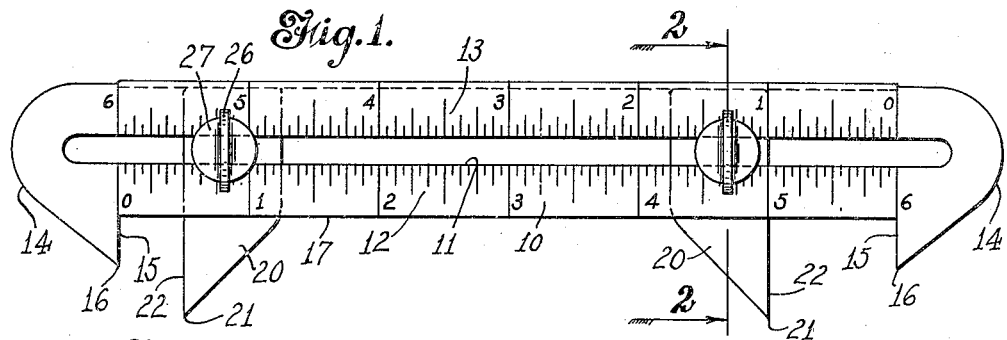
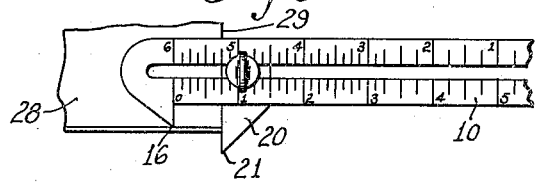
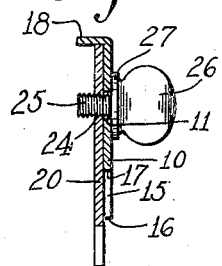
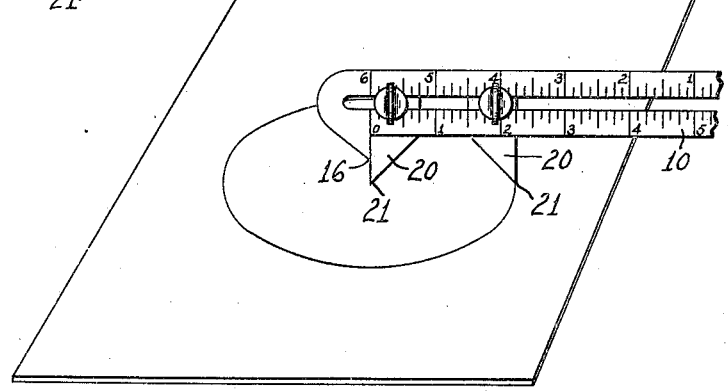
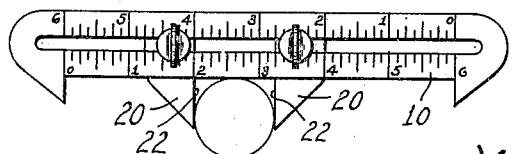
Inventor
Walter J. Daly
By Rockwell & Bartholow
Attorneys Patented Feb. 21, 1950

2,498,397

UNITED STATES PATENT OFFICE 2,498,397

TOOL FOR SHEET METAL WORKERS

Walter J. Daly, Waterbury, Conn.

Application October 10, 1946, Serial No. 702,548

2 Claims. (Cl. 33—27)

This invention relates to a tool for sheet metal workers, although it may be used in connection with other material than metal. It is particularly concerned with a scribing or marking tool which may be employed to mark metal or other material for cutting, and is also adaptable to other uses, such as taking measurements, if desired.

In working with sheet materials, such as sheet metal, for example, it often becomes necessary to mark the metal previously to cutting the same to desired size and shape. For this purpose, it is desirable to provide a simple and inexpensive tool which may be guided along the edge of the sheet of material being marked so as to scribe or mark the sheet at a given distance from the edge. Moreover, the guide or gauge member should be adjustable so that the tool may be set to mark at any desired distance from the edge of the material, and preferably there should be at least two of such members provided, so that the tool may be set to mark the sheet of material at at least two different distances from the edge without readjustment.

Also, the gauge members should be so supported that they will always move to exactly parallel positions in order that the measurements may be correct and in order that the tool may be used for certain purposes other than scribing or marking sheet metal. Some of the additional uses of the tool, as will be referred to hereinafter, are use as a caliper for measuring the diameters of tubes or rods, and use as a compass or divider for laying off and dividing circles and arcs.

One object of the present invention is to provide an economical, simple, and convenient scribing or marking tool for sheet metal workers.

A further object of the invention is to provide a scribing tool having a scribing point at each end and adjustable gauge members which may be moved lengthwise of the tool, and which will cooperate with the scribing point, these gauge members being properly guided in their movements and rigidly held in their adjusted positions.

A still further object of the invention is to provide a tool of the character described which may be conveniently and economically made of sheet metal and which will consist of a relatively small movement of parts.

Still another object of the invention is to provide a tool of the character described which will be of simple construction and economical to manufacture and, at the same time, be capable of use for a number of different purposes.

To these and other ends the invention consists in the novel features and combinations of parts to be hereinafter described and claimed.

In the accompanying drawings:

Fig. 1 is a front elevational view of a scribing tool embodying my invention;

Fig. 2 is a sectional view on line 2—2 of Fig. 1;

Fig. 3 is a perspective view showing the tool in operative position with relation to a piece of sheet material which it is desired to mark;

Fig. 4 is a perspective view showing the use of the tool as a compass; and

Fig. 5 is a front elevational view showing the use of the tool as a caliper.

To illustrate a preferred embodiment of my invention, I have shown in the drawings a tool comprising an elongated body portion 10 made of sheet metal, for example, this portion being provided with an elongated slot 11 and with scale markings 12 and 13, although it will be understood that only one set of scale markings may be employed, if desired. The end portions of the body of the tool may be rounded off, as shown at 14, and brought downwardly from the body of the tool to provide a straight edge 15 and a scribing point 16, the edge 15 preferably being at right angles to the lower edge 17 of the body 10.

As shown in Fig. 2 of the drawings, a flange 18 may be provided integrally on the body portion 10, this flange extending entirely along the edge of the tool opposite the straight edge 17 and extending in a plane substantially at right angles to the plane of the body 10. Preferably, the flange 18 may be formed by bending over the upper portion of the body 10, particularly if the latter is made of sheet metal. As will be hereinafter explained, this flange serves as a guide for the movable arms or gauge members to be hereinafter described.

As illustrated, a pair of gauge elements 20 are provided, these gauge elements also being preferably of sheet material, such as sheet metal, and having upper portions of substantially rectangular shape and lower portions projecting beyond the edge 17 of the body of the tool to points 21. One edge of this triangular portion, shown at 22 in the drawings, is preferably a straight edge which will be disposed parallel to the edge 15 on the body of the gauge.

The edge of each of the gauge members opposite the point 21 or the upper edge, as shown in the drawings, extends at right angles to the edge 22 and, as shown in Fig. 2 of the drawings, fits snugly against the inner or under surface of the flange 18, so that each of the gauge elements will lie snugly against this flange and be supported by it against any tendency to cant, thus maintaining the edge 22 parallel to the edge 15.

Each of the gauge elements 20 is provided with a threaded opening 24 designed to receive the threaded end 25 of a thumb screw 26, this screw passing through the slot 11 and having a flange 27 adapted to abut the surface of the body portion 10 adjacent the slot so that, when the thumb screw is tightened, the gauge element will be held tightly in place. It will be apparent that by loosening the thumb screw the gauge element may be moved longitudinally of the tool to the desired position as determined by the scales 12 and 13 and again clamped in place. Also, by removing the thumb screw 26, one of the gauge elements may be moved to the side of the other one opposite that shown in the drawings and again secured in place, so that the straight edges 22 may oppose each other instead of opposing the edges 15 of the body of the tool.

In Fig. 3 of the drawings I have shown the position occupied by the tool when marking a piece of sheet metal 28. The gauge element 20 is set with its edge 22 at the required distance from the edge 15. It will be seen that the edge 22 is longer than the edge 15, thus spacing the point 21 at a greater distance from the edge 17 than the point 16, so that the edge 22 may be guided by the edge 29 of the sheet of material 28, while the point 16 scribes or marks the material at the proper distance from the edge 29. As previously explained, the other gauge element 20 may be conveniently set at a different distance from the corresponding edge 15, so that if it is necessary to make two different markings on a sheet of material, as is often the case, this can be done without intermediate adjustment of the tool.

In Fig. 4 of the drawings I have shown the device when used as a compass. In this instance, the points 21 become the scribing or marking points, and, as the edges 22 are longer than the edges 15, the points 21 of the two gauge elements will come in contact with the surface to be marked, although the scribing points 16 will be considerably above this surface so as not to interfere with the marking operation.

In Fig. 5 of the drawings I have shown my tool employed as a caliper. In this instance, one of the gauge elements 20 has been moved to the side of the gauge element opposite that shown in Fig. 1, so that the edges 22 oppose each other and may be brought against the opposite sides of a pipe or other object which it is desired to measure.

It will be obvious that the tool illustrated herein is of simple construction and may be readily and economically made of sheet metal, for example, while, at the same time, the gauge elements will be held rigidly in any adjusted position so that the tool will be accurate and will be capable of being employed for a number of different functions.

While I have shown and described a preferred embodiment of my invention, it will be understood that it is not to be limited to all of the details shown, but is capable of modification and variation within the spirit of the invention and within the scope of the claims.

What I claim is:

1. A scribing tool having a body portion comprising a flat plate-like member having an integrally formed end portion projecting laterally from the body portion, said end portion being formed with a scribing point, a gauge element having a straight edge extending transversely of the body and projecting therefrom, means for adjustably securing said gauge element flatly against one face of the body portion, said gauge element comprising a flat member of sheet material having its straight edge upon the side facing the point of the end portion and being pointed on its projecting end, the projecting end of the gauge element being disposed at a greater distance from the adjacent edge of the body portion than is the point of the end portion, and said body portion having a laterally extending flange along the opposite edge thereof against which one edge of the gauge element is abutted.

2. A scribing tool as in claim 1 in which a pair of similar gauge elements are adjustably secured to the body portion with the straight edges oppositely disposed and in which the body portion is provided with pointed projections at both ends.

WALTER J. DALY.

REFERENCES CITED

The following references are of record in the file of this patent:

UNITED STATES PATENTS

| Number | Name | Date |
|---|---|---|
| 13,237 | Swany | July 10, 1855 |
| 367,290 | Gilmer | July 26, 1887 |
| 517,696 | Hunter | Apr. 3, 1894 |
| 1,011,390 | Stubbs | Dec. 12, 1911 |
| 1,392,825 | Gonzales | Oct. 4, 1921 |
| 1,700,857 | Schultz | Feb. 5, 1929 |
| 1,739,440 | Ciliske | Dec. 10, 1929 |
| 1,753,191 | Armstrong | Apr. 8, 1930 |